United States Patent [19]

Tierney

[11] Patent Number: 4,784,468

[45] Date of Patent: Nov. 15, 1988

[54] DISPLAY MONITOR SHIELD ASSEMBLY

[75] Inventor: Leonard J. Tierney, 2413 Arctice Ave., Virginia Beach, Va. 23451

[73] Assignees: Leonard J. Tierney, Virginia Beach; Walter G. Ball, Norfolk, both of Va.

[21] Appl. No.: 124,521

[22] Filed: Nov. 24, 1987

[51] Int. Cl.⁴ .............................................. G02B 27/00
[52] U.S. Cl. .................................. 350/276 R; 358/252
[58] Field of Search ...................... 350/276 R; 358/252

[56] References Cited

U.S. PATENT DOCUMENTS 4,444,465  4/1984  Giulie et al. ...................... 350/276 R
4,569,572  2/1986  Kopich ............................ 350/276 R
4,633,324  12/1986  Giulie .

Primary Examiner—John K. Corbin
Assistant Examiner—Rebecca D. Gass
Attorney, Agent, or Firm—Griffin, Branigan, & Butler

[57] ABSTRACT

A display-monitor shield assembly (10) comprises a rigid monitor shield (12) having parallel hinges (26, 28, etc.) extending along the length thereof, and a belt (16) and buckle (14) attached thereto for looping tightly about display monitors to hold the display monitor shield assembly thereon. The belt and buckle are attached to a hinged tab (36) at a mounting end of the shield and the tab and other contact portions of the shield include friction pads (19, 20, 21, etc.) on inside surfaces thereof so that moderate pressure of the belt against these pads holds the shield assembly tightly on the display monitors but yet allows adjustment of the shield. Side panels (61,62,etc.) of the shield can be folded up so that the shield assembly can be made smaller to be placed on smaller display monitors.

12 Claims, 2 Drawing Sheets

DISPLAY MONITOR SHIELD ASSEMBLY

BACKGROUND OF THE INVENTION

This invention relates broadly to the art of display monitors, and more specifically to accessories for improving the use of display monitors in various environments.

It is often difficult to view display monitors, such as CRT tubes, LDC's, and the like in brightly lighted areas, such as outdoors in daytime, because ambient, or surrounding, light often reduces contrast to the point that lighted images cannot be easily seen. This problem is especially acute for technicians, who regularly work outdoors with CRT monitors. It is an object of this invention to provide an accessory to be used with display monitors which will shade screens thereof thereby making the monitors more useful in brightly lighted areas, such as outdoors in the daytime.

In order to observe display monitors outdoors in the daytime, users have sometimes wrapped cardboard about the monitors or otherwise tried to screen them in some manner. Specialize CRT shields or hoods, are disclosed in U.S. Pat. Nos. 4,569,572 to Kopich and 4,633,324 to Giulie, however, the devices described in these patents are somewhat difficult to manufacture and use. With regard to the manufacture thereof, these devices are rather complicated, requiring numerous parts. Regarding the use thereof, the devices cannot be used with large varieties of monitor sizes. The device of Giulie employs a pressure sensitive tape which becomes ineffective and therefore it cannot be easily moved from monitor to monitor. Also, the adhesive of the tape sometimes leaves a residue on monitors. It is an object of this invention to provide a display monitor shield assembly which can be used on a large variety of monitor sizes, which does not damage monitors in anyway, and which is easy to tightly install on monitors.

Another problem with such screens described in the prior art is that their positions on monitors are not easy to adjust. In this respect, when using a display monitor outdoors, conditions often change requiring the adjustment of any screening shields therefor. In this respect, the sun moves, people move, and light conditions change. Although the device described in U.S. Pat. No. 4,569,572 to Kopich does allow vertical adjustment, the combination of elements which allows this adjustment is relatively complicated and cannot be easily used with monitors of varying sizes. It is an object of this invention to not only provide a display monitor shield assembly that can be used with displays of various sizes and shapes, but one whose position can be easily adjusted on these monitors of various sizes.

SUMMARY

According to principles of this invention, a portable monitor shield assembly comprises a relatively rigid monitor shield having parallel hinges extending along the length thereof and a belt and a buckle mounted at a mounting, or rear, end of the monitor shield. The belt can be looped about a monitor on which the monitor shield is to be mounted and engage with the buckle for tightly holding the shield on the monitor display. The shield includes friction pads on its inside surface at the mounting end at points at which the belt contacts the shield when it is tightly looped about a monitor. Side flaps of the shield can be folded up so that the shield can be made to fit many different size monitors.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

A portable monitor shield assembly includes a shield 12, a buckle 14, a belt 16, and friction pads 18, 19, 20, 21, 22, 23 and 24.

Figure 2:
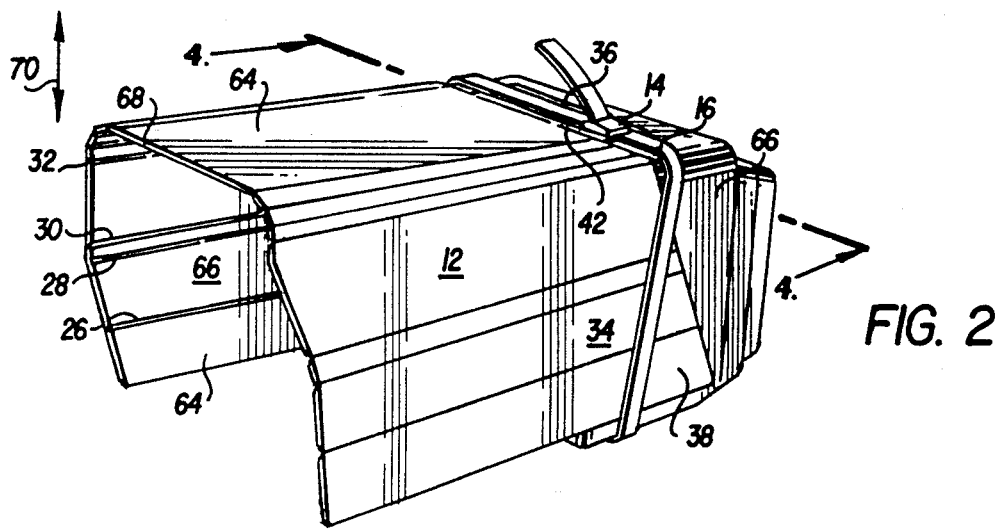
FIG. 2 is an isometric view of the display monitor shield assembly of FIG. 1 mounted on a relatively large display monitor.
Figure 3:
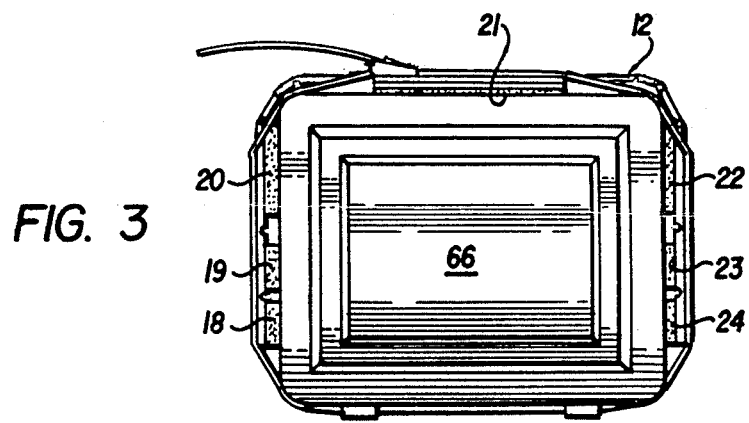
FIG. 3 is a rear view of the items shown in FIG. 2.
Figure 5:
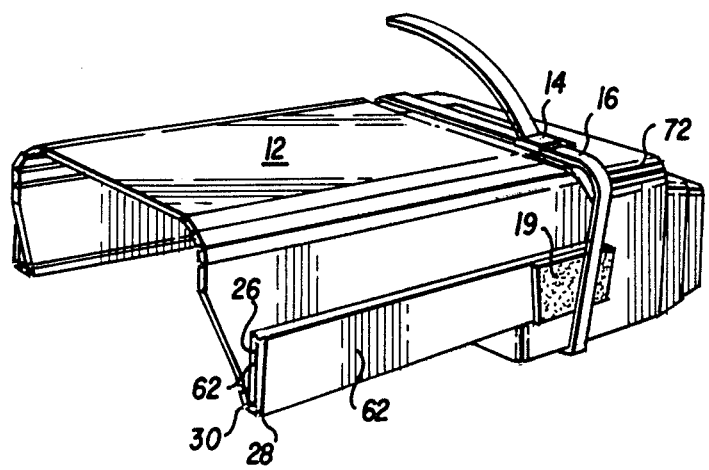
FIG. 5 is an isometric view similar to FIG. 2 with the portable monitor shield of FIGS. 1-4 having its side flaps folded up to be mounted on a relatively small display monitor.

The shield 12 is molded of polypropylene plastic to have a thickness of approximately 1/16 inch. Although the polypropylene plastic is relatively rigid, it is molded with extremely thin hinge lines 26, 28, 30, 32, etc. which allow the screen to be folded along longitudinal lines as is shown in FIGS. 2, 3, and 5. Other hinge lines are also shown in the drawings which are not numbered.

The shield 12 has a mounting end portion 34 which includes a buckle mounting tab 36 and contact-area triangles 38 and 40. A thin hinge line 42 is molded between the buckle-mounting tab 36 and the rest of the shield 12.

Figure 4:
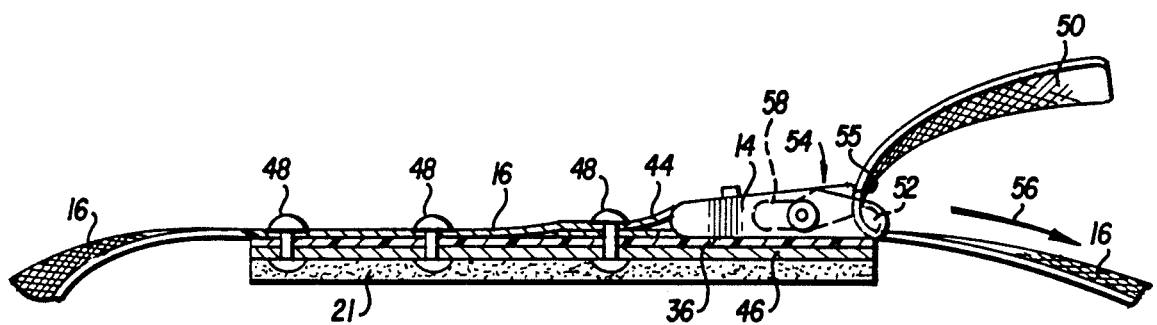
FIG. 4 is an enlarged side view taken on line 4—4 in FIG. 2.

The buckle 14 is attached to a loop 44 of the belt 16 as can be seen in FIG. 4 and the belt 16 is riveted to the top side of the buckle-mounting tab 36 and a reinforcement plate 46 (which may be of steel, aluminum, hard plastic, etc.) by means rivets 48. The buckle 14 is of a type for receiving a free belt end 50 about a post 52 and allowing the free belt end 50 to be easily pulled, with a latch 54 riding on the belt 16. However, a roughened end 55 of the latch 54 is biased in a clockwise direction as seen in FIG. 4 so that it tightens on the belt to prevent pulling of the belt in a direction indicated by arrow 56 unless a leaver portion 58 of the latch 54 is pressed downwardly, thereby relieving the latch 54 from the belt 16.

In the preferred embodiment, the belt is constructed of a one (1) inch wide nylon webbing strap, however, other types of belts could also be used in this invention.

The reinforcement plate 46 spreads out the forces acting on the tab 36 and thereby strengthens it.

Figure 1:
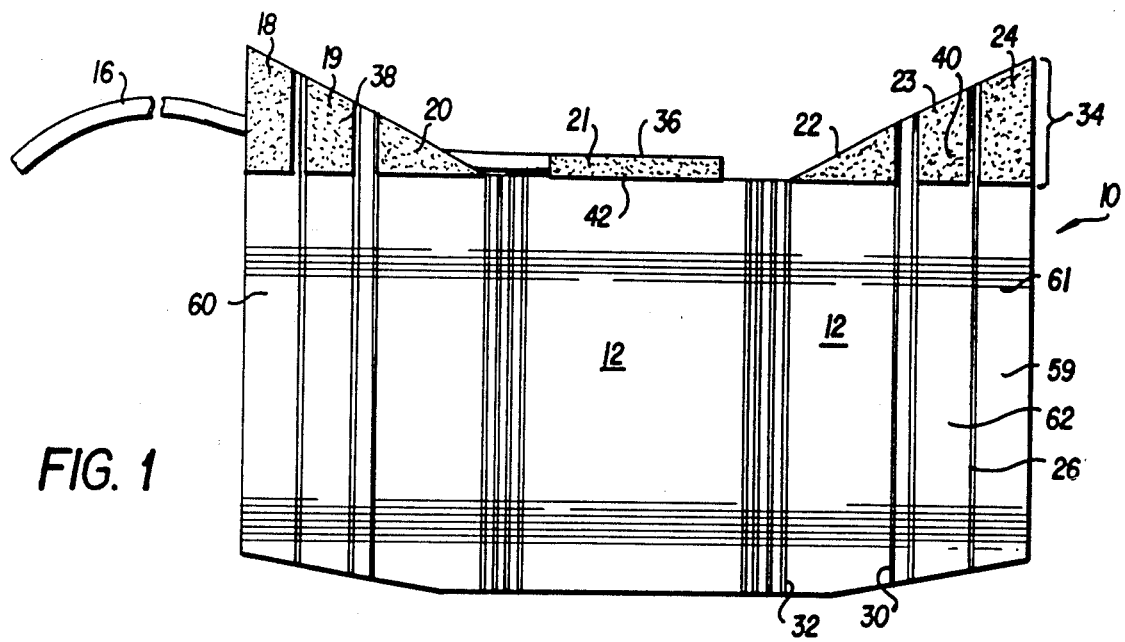
FIG. 1 is a bottom plan view of the display monitor shield assembly of this invention with a shield thereof extended to be flat.

The friction pads 18–24, which are constructed of neoprene foam rubber, are located on inner surfaces of side flaps 59 and 60 at the mounting end portions 34 thereof and on the inside surface of the buckle mounting tab 36 as can be seen in FIGS. 1 and 3. In this regard, these neoprene, ¼ inch pads are glued directly to the inside surface of the shield 12, in the cases of the pads at the contact area triangles 38 and 40 and to the bottom surface of the steel reinforcement plate 46 in the case of the buckle mounting tab 36. It should be noted that the contact-area triangle pads 18, 19, 20, 22, 23, and 24 are separated at the hinge lines 26, 28, 30, 32, etc. to allow panels, 61, 62 etc. on which these respective pads are mounted to fold relative to one another. Similarly, the friction pad 21 on the buckle mounting tab 36 does not extend over the hinge line 42 in order that the buckle mounting tab 36 can hinge relative to a top panel 64 of the shield 12.

In use of the monitor shield assembly 10, the buckle mounting tab 36 is placed on top of a display monitor 66 as is shown in FIG. 2 with the top panel 64 of the shield 12 extending approximately horizontally outwardly from the display monitor 66 over a display screen (not shown) thereof and the side panels 60 and 62 of the shield 12 are folded downwardly onto the sides of the display monitor 66 as is shown in FIG. 2. The belt 16 is wrapped about the display monitor 66 and engaged about the buckle post 52 as is shown in FIG. 4 and the free belt end 50 is pulled outwardly so as to tighten the belt 16 about the display monitor 66 as is shown in FIG. 2. Once the belt is moderately tight, it is released so that latch 54 of the buckle 14 can hold it in this position. The belt 16 extends about the rearwardly protruding contact area triangles 38 and 40 so that when the belt 16 is tightened, the friction pads 18, 19, 20, 22, 23, and 24 thereunder are urged against an outer surface of the display monitor 66. These contact area triangles 38 and 34, being rigidly affixed to panels of the shield, help support the shield extending approximately horizontal away from the display monitor 66 as is shown in FIG. 2 so as to shield a display (not shown) thereof from surrounding light.

Should a user wish to reposition the shield 12 vertically, he normally does so by moving an outer end 68 of the shield 12 up or down as shown by arrow 70. When this is done the contact area triangles 38 and 40 slide between the belt 16 and the display monitor 66. However, when the outer end 68 is released, tightness of the belt 16 continues to exert pressure on the friction pads 18–24 to hold the shield in its new position. If the belt 16 is fastened so tightly that the shield cannot be easily adjusted, which is not normally the case, a user can loosen the belt 16 by depressing the buckle leaver 58, before moving the outer end 68 of the shield 12 as shown by arrow 70 in FIG. 2 and then re-tighten the belt 16 by pulling the free belt end 50. In either case the belt holds the friction pads 18, 19, 20 and 22, 23, 24 against the outer surface of the display monitor 66 to hold the shield 12 in this new position.

It will be appreciated by those skilled in the art that the friction pad 21 under the tab 36 provides a major support for the top panel 64 as well as the rest of the shield 12 in conjunction with the other friction pads. Also, the hinge line 42 of the tab 36 allows up and down movement of the screen as is described above relative to the tab 36 which is pressed in flat contact with a top surface of the display monitor 66 by tautness in the belt 16 to provide great support.

FIG. 5 depicts a use of this invention with a display monitor 72 which is much smaller than the display monitor 66 of FIG. 2. In order to fit this smaller display monitor the side panels 60 and 62 are folded up on hinge lines 26, 28 and 30 so that the shield 12 now fits this smaller display monitor 72. Otherwise, the display monitor of FIG. 5 is exactly the same as the display monitor of the other Figures.

It will be appreciated by those of ordinary skill in the art that the monitor shield assembly of this invention is inexpensive to construct, but yet is extremely effective in use. In this regard, the monitor shield assembly is easy to mount and adjust on a display monitor. Further, one monitor shield assembly of this invention can be mounted on a variety of display monitor sizes and be just as effective on each. Still further, the monitor shield assembly of this invention is integrated into one part rather than comprising several parts. This makes the shield assembly easier to transport and mount than if it were constructed of several parts which would have to be assembled by a user. Also, the assembly is quite light in weight, both the polypropylene and the neoprene foam rubber being light in weight.

While the invention has been particularly shown and described with reference to a preferred embodiment, it will be understood by those skilled in the art that various changes in form and detail may be made therein without departing from the spirit and scope of the invention. For example, other types of buckles and belts could be used instead of those depicted herein. Further, other types of friction pads, materials and/or shield configurations could be used. With regard to other shield configurations, it would be possible to have more hinge lines on the side flaps 59 and 60 so that there are more side panels and more friction pads, one friction pad on each panel. Such additional hinge lines might make the monitor shield assembly more adaptable to various size display monitors. It should be understood that the hinge lines should be positioned and spaced to allow the panels to be folded onto one another as depicted in FIG. 5 or they could be arranged to allow the panels to be folded onto one another, accordion style.

The embodiments of the invention in which an exclusive property or privilege are claimed are defined as follows:

1. A portable monitor shield assembly comprising:
   a relatively rigid monitor shield to be mounted on a display monitor to shield a display screen thereof from surrounding light, said monitor screen having a plurality of approximately parallel hinges extending along the length thereof to allow said shield to be folded about a display monitor to thereby partially enclose said monitor display screen, said monitor shield having a rear, mounting end to be mounted at the monitor and forward viewing end directed toward a viewer observing the monitor;
   a belt having a first end attached to said monitor shield near said mounting end for wrapping about said monitor when said monitor shield is mounted on said monitor, and a second end portion; and
   a buckle mounted on said monitor shield near said mounting end for receiving and engaging said second end portion of said belt so as to selectively allow said second end portion to move longitudinally relative to said buckle or to not move longitudinally relative to said buckle;
   whereby said belt can be wrapped about a display monitor, engaged with said buckle, and closed to a tight loop for tightly gripping said monitor, thereby mounting said portable display monitor shield assembly on said display monitor.

2. A portable monitor shield assembly as in claim 1 wherein is further included a buckle mounting tab protruding outwardly from said shield in the direction of said mounting end and said buckle is mounted on said tab, said tab being attached to the rest of said shield by means of a hinge.

3. A portable monitor shield assembly as in claim 2 wherein said buckle mounting tab is mounted at a center top portion of said shield and wherein is further included protruding contact areas attached to said shield and protruding in the direction of said mounting end at the sides of said monitor shield.

4. A portable monitor shield assembly as in claim 3 wherein are further included friction pads on the inside surface of said shield at said contact areas.

5. A portable monitor shield assembly as in claim 4 wherein said friction pads are included on all of said contact areas and said tab.

6. A portable monitor shield assembly as in claim 2 wherein are further included friction pads on the inside surface of said shield at said contact areas.

7. A portable monitor shield assembly as in claim 6 wherein said friction pads are included on all of said contact areas and said tab.

8. A portable monitor shield assembly as in claim 1 wherein are further included friction pads on the inside surface of said shield at said contact areas.

9. A portable monitor shield assembly as in claim 8 wherein said friction pads are included on all of said contact areas and said tab.

10. A portable monitor shield assembly as in claim 9 wherein said friction pads are constructed of rubber.

11. A portable monitor shield assembly as in claim 8 wherein said friction pads are constructed of rubber.

12. A portable monitor shield assembly as in claim 1 wherein side flaps of said shield can be folded on said parallel hinges so that said monitor shield assembly can be made smaller to fit various sized display monitors.

* * * * *